United States Patent
Mazzocchi et al.

(10) Patent No.: US 10,220,807 B2
(45) Date of Patent: Mar. 5, 2019

(54) RESTRICTED-OPENING DOOR HINGE FOR AUTOMOTIVE AIR BAG CHUTE

(71) Applicant: Ford Global Technologies, LLC, Dearborn, MI (US)

(72) Inventors: Nicholas A. Mazzocchi, Ann Arbor, MI (US); Frank Q. Liu, Canton, MI (US); Kenneth J. Kwasnik, Shelby Township, MI (US); Thomas J. Luckett, Saline, MI (US); James P. Yizze, Macomb, MI (US); Matthew J. Hickey, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 98 days.

(21) Appl. No.: 15/465,896

(22) Filed: Mar. 22, 2017

(65) Prior Publication Data
US 2018/0272983 A1   Sep. 27, 2018

(51) Int. Cl.
*B60R 21/2165* (2011.01)
*B60R 21/205* (2011.01)
*B60R 21/216* (2011.01)

(52) U.S. Cl.
CPC ........ *B60R 21/2165* (2013.01); *B60R 21/205* (2013.01); *B60R 21/216* (2013.01)

(58) Field of Classification Search
CPC ... B60R 21/205; B60R 21/215; B60R 21/216; B60R 2021/21537
See application file for complete search history.

(56) References Cited

U.S. PATENT DOCUMENTS

| | | | |
|---|---|---|---|
| 5,306,042 A | 4/1994 | Frank | |
| 5,338,060 A * | 8/1994 | Soderquist | B60R 21/21656 280/728.2 |
| 7,007,970 B2 | 3/2006 | Yasuda et al. | |
| 7,210,700 B2 | 5/2007 | Zagrodnick et al. | |
| 7,594,674 B1 | 9/2009 | Biondo et al. | |

(Continued)

FOREIGN PATENT DOCUMENTS

| | | | |
|---|---|---|---|
| DE | 10306385 A1 | 11/2004 | |
| KR | 102010001500 | * 2/2010 | ........... B60R 21/205 |

OTHER PUBLICATIONS

Lee, Airbag Apparatus for Vehicle, Feb. 3, 2010, KPO, 10-2010-0011500, Machine Translation of Description (Year: 2010).*

*Primary Examiner* — James A English
(74) *Attorney, Agent, or Firm* — Vichit Chea; MacMillan, Sobanski & Todd, LLC

(57) ABSTRACT

An air bag chute assembly mounts a passenger air bag module to an automotive instrument panel. An outer flange collar of the assembly attaches to the instrument panel and defines a windshield-facing side. A tubular chute extends interiorly from the collar to a lower end that attaches to the air bag module. A door flap is disposed in an upper end of the chute. An S-shaped hinge has a first edge attached to the door flap. An apron extends from the collar laterally into the deployment path from the windshield-facing side. A second edge of the hinge attaches to the apron so that a sweep zone of the door flap is shifted by a distance corresponding to a reduction in a width of the deployment path at the upper end caused by the apron, reducing interference between the flap and a windshield during air bag deployment.

18 Claims, 8 Drawing Sheets

(56) References Cited

U.S. PATENT DOCUMENTS

| | | | |
|---|---|---|---|
| 7,828,323 B1 | 11/2010 | Mazzocchi et al. | |
| 8,181,987 B2 | 5/2012 | Mazzocchi et al. | |
| 8,424,905 B2 | 4/2013 | Brunet | |
| 9,156,428 B2 | 10/2015 | Edeline | |
| 9,321,419 B2 | 4/2016 | Kwasnik et al. | |
| 9,352,716 B2 | 5/2016 | Liu et al. | |
| 9,533,649 B2* | 1/2017 | Luckett et al. | |
| 2008/0136145 A1* | 6/2008 | Kong | B60R 21/2165 280/728.3 |
| 2011/0316262 A1* | 12/2011 | Mazzocchi | B60R 21/215 280/728.3 |
| 2013/0001929 A1 | 1/2013 | Mazzocchi et al. | |
| 2014/0265261 A1* | 9/2014 | Surdu | B60R 21/20 280/728.2 |
| 2015/0258957 A1* | 9/2015 | Liu | B60R 21/215 280/728.2 |
| 2016/0075301 A1* | 3/2016 | Kwasnik | B60R 21/2165 280/728.3 |
| 2016/0167612 A1* | 6/2016 | Svensson | B60R 21/215 280/728.3 |

* cited by examiner

RESTRICTED-OPENING DOOR HINGE FOR AUTOMOTIVE AIR BAG CHUTE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive air bag systems, and, more specifically, to a hidden air bag deployment door formed by an instrument panel substrate and a molded air bag chute.

Air bag deployment chute assemblies have been put into commercial use for the passenger side of an instrument panel of automotive vehicles. The chute assembly couples an air bag module (typically containing a folded canvas bag and chemical propellants for inflating the bag on command) to a door support panel or substrate of the instrument panel. A typical structure for a chute assembly includes a tubular outer chute wall, one or more door flaps, a flange surrounding the door area, and one or more hinge members or areas connecting the door flaps to the outer wall and flange.

For styling purposes, it is desirable for the air bag deployment door in the instrument panel to be invisible when viewed from the passenger compartment. In other words, the visible or "Class A" surface of the instrument panel is preferably seamless. Therefore, a pre-weakened seam is required in the substrate (on the "Class B" side) to facilitate tearing open of the door during air bag deployment. In order to prevent torn or severed pieces of the substrate from being expelled into the passenger cabin, the door flap(s) of the chute attach to the substrate door area so that the door flap(s) and hinge act as a tether. A common method to attach the chute door flap(s) and flange to the substrate has been by plastic welding, such as vibration welding, hot-plate welding, and the like.

For optimum protection of a passenger, the passenger-side air bag door is placed in or near the top surface of the instrument panel which results in the door being close to the front windshield of the vehicle. Consequently, impingement of the door against the windshield as it swings open during deployment of the air bag becomes a potential pitfall in the event the windshield could be damaged. Existing styling trends that increase the slant of the windshield and that shorten the front-to-back depth of the instrument panel magnify this concern.

SUMMARY OF THE INVENTION

In one aspect of the invention, an air bag chute assembly for an automotive instrument panel comprises an outer flange collar configured to attach to the instrument panel and defining a window-facing side. A tubular chute extends interiorly from the collar to a lower end defining a deployment path configured to receive an inflating air bag from an air bag module. A door flap is disposed in an upper end of the chute and spaced from the collar. An S-shaped hinge with a first edge is arranged along a side of the door flap. An apron extends in a predetermined direction laterally into the deployment path from the window-facing side of the collar. The apron comprises a pocket with an inner end receiving a second edge of the hinge so that a sweep zone of the door flap is shifted in the predetermined direction by a distance corresponding to a reduction in a width of the deployment path at the upper end caused by the apron.

DETAILED DESCRIPTION OF PREFERRED EMBODIMENTS

Figure 1:
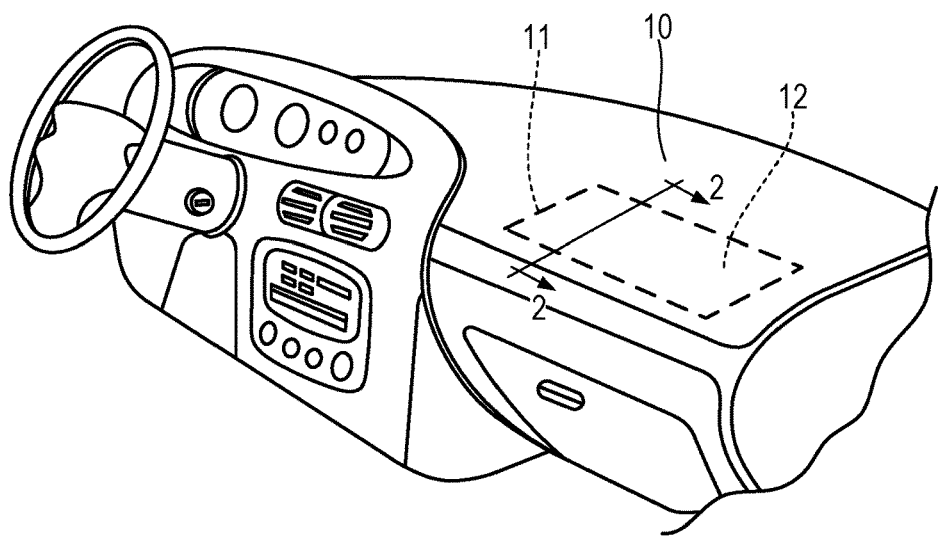
FIG. 1 is a perspective view of an automotive instrument panel system showing a passenger air bag deployment area.
Figure 2:
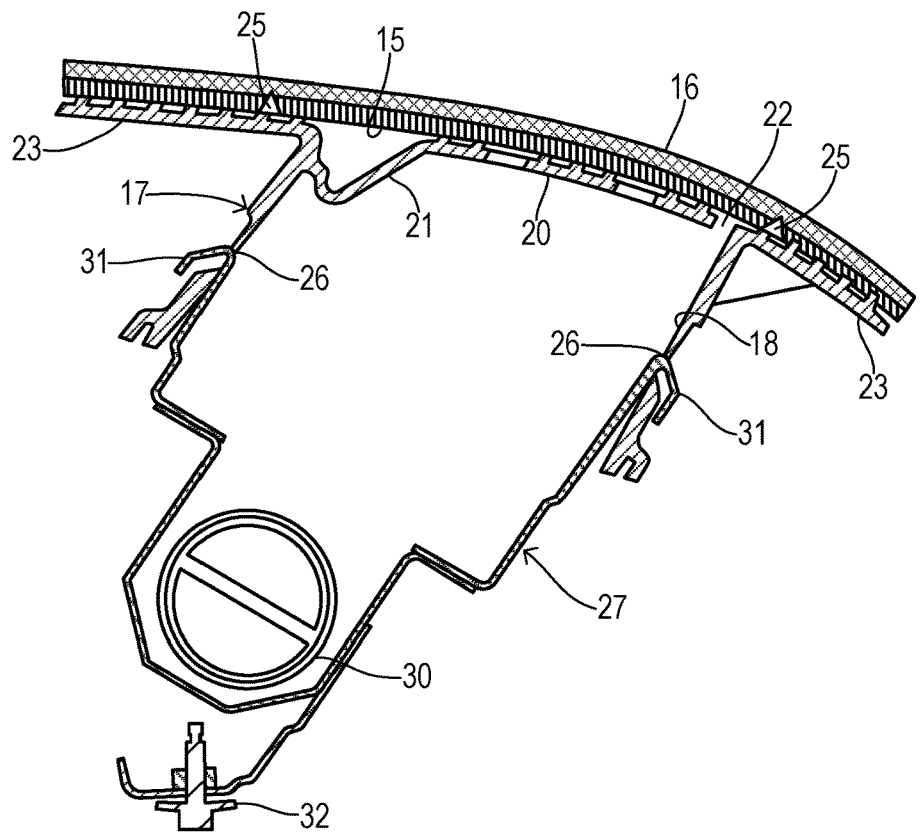
FIG. 2 is a cross-sectional view along line 2-2 of FIG. 1 showing one type of conventional passenger air bag system.
Figure 3:
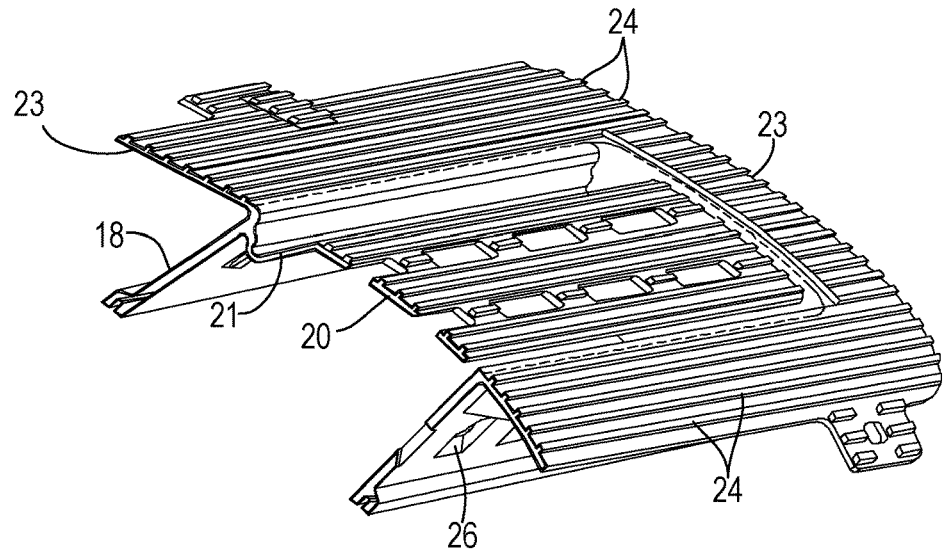
FIG. 3 is a cross-sectional, perspective view of the air bag chute assembly of FIG. 2.
Figure 4:
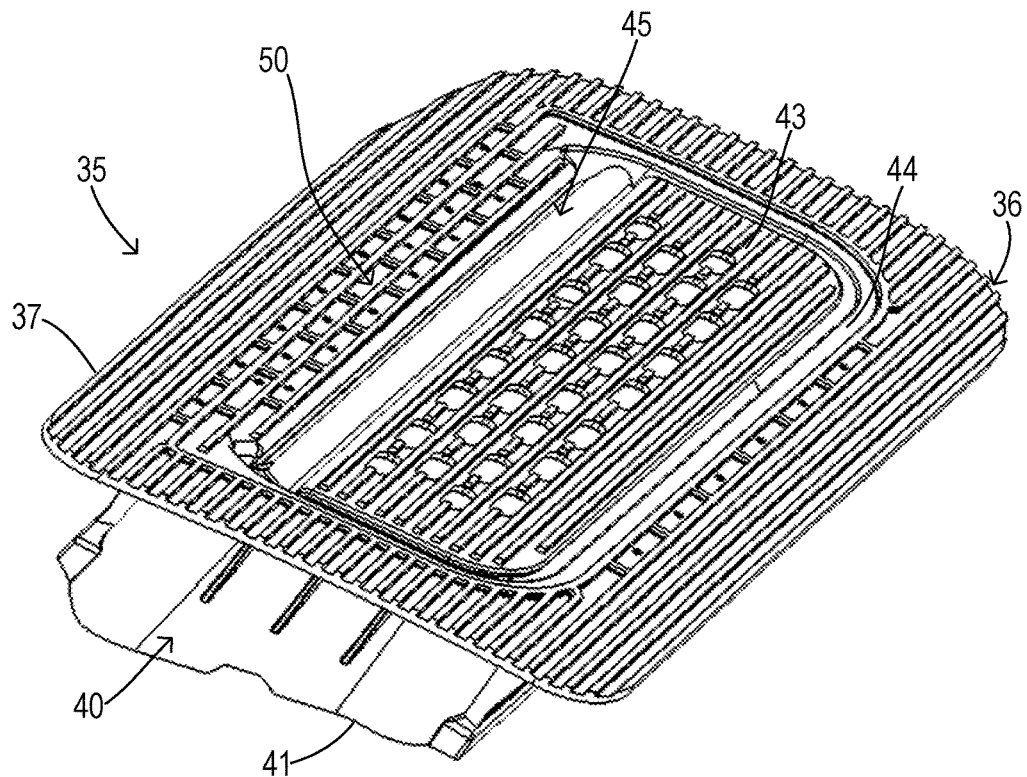
FIG. 4 shows a top perspective view of a chute assembly according to one embodiment of the invention.

Referring now to FIGS. 1-3, an instrument panel 10 includes a passenger air bag system with a hidden seam 11 defining a deployment door area 12. An instrument panel substrate 15 provides the desired shape and rigidity for the instrument panel. It is overlaid by a cover layer 16 which may include a conventional elastomeric skin and a layer of foam between the skin and substrate 15. A chute 17 includes a tubular passageway 18 and a deployment door flap 20 at the upper end thereof. Deployment door 20 is coupled to passageway 18 by a hinge 21 along one side. A gap 22 may define an outer edge on three sides of door 20, for example. Instead of a gap, a pre-weakened seam may be employed. Chute 17 includes a flange 23 surrounding door 20. As better shown in FIG. 3, flange 23 and door 20 have a plurality of ribs 24 for welding chute 17 to instrument panel substrate 15.

As shown in FIG. 2, instrument panel substrate 15 and covering layer 16 may include a hidden seam 25 for tearing during opening of deployment door 20. Seam 25 may be formed by mechanical or laser scoring prior to attachment of chute 17 by vibration welding. An air bag module 27 is mounted to a plurality of holes 26 in chute passageway 18. Air bag module 27 is comprised of a rigid box containing a propellant source 30 and a folded bag (not shown) that is guided via passageway 18 to door 20 upon inflation by gases from propellant source 30. Air bag module 27 includes a plurality of hooks 31 that are received in a corresponding plurality of windows 26. A fastener 32 couples air bag module 27 to a cross-car beam via a bracket.

Hinge 21 is preferably formed with an S-shaped or Z-shaped cross section so that hinge 21 extends lengthwise while simultaneously providing a pivot axis. Therefore, door flap 20 can expand upward more evenly during initial air bag deployment to provide better tearing of the tear seams, and can then pivot out of the way as the air bag emerges from chute 17.

For obtaining a desired strength and appearance, an instrument panel substrate and a chute may be preferably formed of moldable thermoplastic materials. Preferred materials include thermoplastic polyolefin (TPO), Thermal Plastic Elastomers (TPE), and Thermal Plastic Elastomer Olefin (TEO). The most preferred material is TPO compounded with fillers that modify the material's melting temperature, flexural modulus (i.e., stiffness), and other properties.

Air bag module 27 is configured to provide an optimal deployment profile for the air bag according to various parameters, such as bag volume, inflation time, gas flow rate, and others. A metal case and an outlet of air bag module 27 are sized according to these parameters. An internal diameter of chute passageway 18 is configured to match the outlet of module 27 to provide a smooth transition for the emerging air bag. Similarly, hinge 21 and door flap 20 have been configured to deploy in a manner that opens the top end of passageway 18 without restriction.

As previously mentioned, styling and other design considerations for components of a motor vehicle such as the instrument panel front-to-back width and the angling of the windshield can result in a desired position for an air bag deployment door area that is close to the windshield. To keep the door out of the way of the deploying air bag and to minimize the throwing of any loose pieces into a passenger area, the hinge for a U-shaped, single-panel door is preferably placed at the car-forward side of the chute (i.e., the side closest to the windshield). If close enough, then a sweep zone of the door flap might overlap with the windshield so that an impact of the door against the windshield during air bag deployment could occur. A smaller diameter chute with a shorter door flap could be used to reduce or eliminate the overlap, but it would be difficult and/or expensive to redesign/modify a customized air bag module with a sufficient inflation gas capacity and deployment profile to meet the performance requirements.

The present invention adapts a chute assembly to work with a conventional air bag module outlet size while shifting and shortening a door sweep zone to reduce interference with a windshield at the car forward size of the air bag door opening. A first embodiment of a chute assembly 35 is shown in FIGS. 4-6 and 8-13, wherein an outer flange collar 36 is configured to attach to the instrument panel substrate in a known manner. Collar 36 defines a window-facing side 37. A tubular chute 40 extends interiorly from collar 36 to a lower end 41 defining a deployment path 42 configured to receive an inflating air bag from an air bag module (not shown). A door flap 43 is disposed in an upper end of chute 40 and spaced from collar 36 on three sides by a gap 44. An S-shaped hinge 45 has a first edge 46 arranged along a side of door flap 43. In order to shift and shorten the door sweep zone, an apron 50 extends in a predetermined direction (i.e., away from the car-forward side) laterally into deployment path 42 from window-facing side 37 of collar 36.

Figure 5:
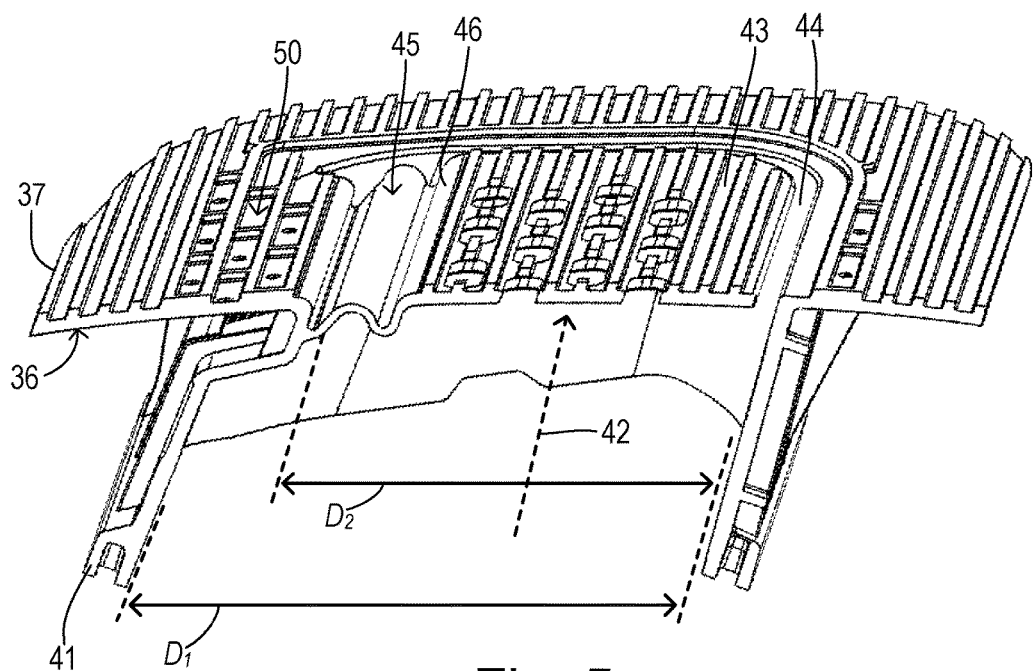
FIG. 5 shows a cross section of the chute assembly of FIG. 4.
Figure 6:
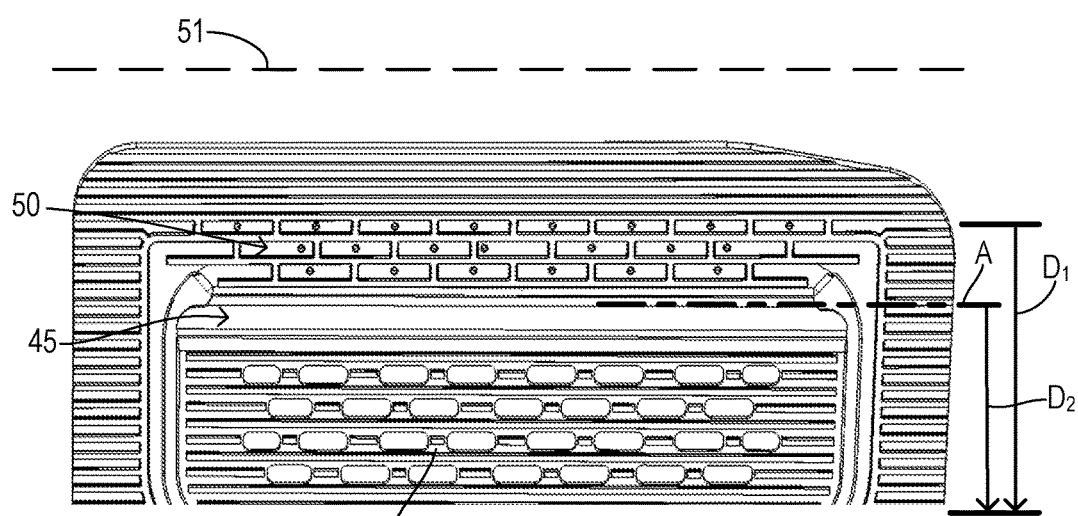
FIG. 6 is a top view of the chute assembly of FIG. 4 showing a hinge offset.
Figure 7:
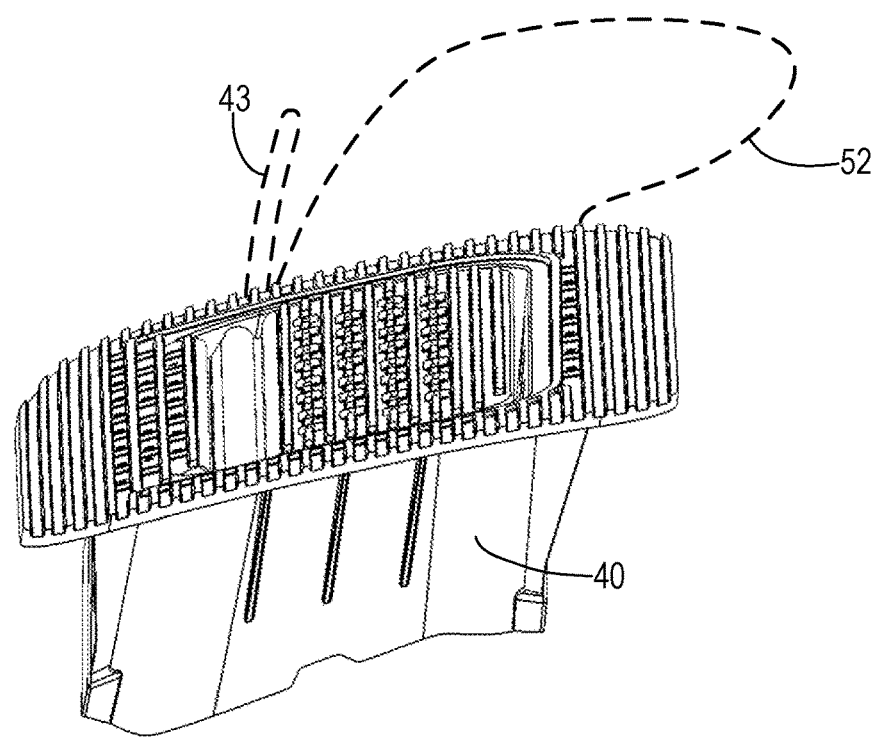
FIG. 7 is a side view of the chute assembly of FIG. 4 indicating an air bag deployment area and a resulting swing of the door flap to an opened position.

By displacing the pivot axis of hinge 45 in the predetermined direction away from the windshield without changing the size or shape of the main chute passageway, a width $D_2$ of deployment path 42 at the upper end of the passageway at the door opening which is caused by apron 50 is narrowed from a width $D_1$ at the lower end (as shown in FIG. 5). The top view in FIG. 6 shows a windshield edge 51. A pivot axis A is moved away from windshield edge 51 by anchoring hinge 45 to an inner edge of apron 50. In addition, the radial length of door flap 43 is shortened by an equal amount. Consequently, a sweep zone over which door flap traverses during opening is both shifted and shortened. Preferably, a length of apron 50 (which equals $D_1 - D_2$) is selected based on the relative positions of the windshield and the chute assembly (e.g., a minimum narrowing of the door opening is determined which is just enough to avoid interference with the windshield). As shown in FIG. 7, an opened position of door flap 43 shown by dashed lines is still large enough to provide relatively unimpeded deployment of an air bag 52. In a preferred embodiment, the length of apron 50 is such that the reduction of the width of the deployment path is greater than 5% (i.e., $D_2$ is less than or equal to about 95% of $D_1$). In order to ensure a sufficiently unimpeded passage of the deploying air bag, the reduction of the width of the deployment path may preferably be in a range from 5% to 40% (i.e., $D_2$ is in a range of $0.95 \cdot D_1$ to $0.60 \cdot D_1$). More preferably, the reduction of the width of the deployment path may preferably be in a range from 15% to 35% (i.e., $D_2$ is in a range of $0.85 \cdot D_1$ to $0.65 \cdot D_1$).

Figure 8:
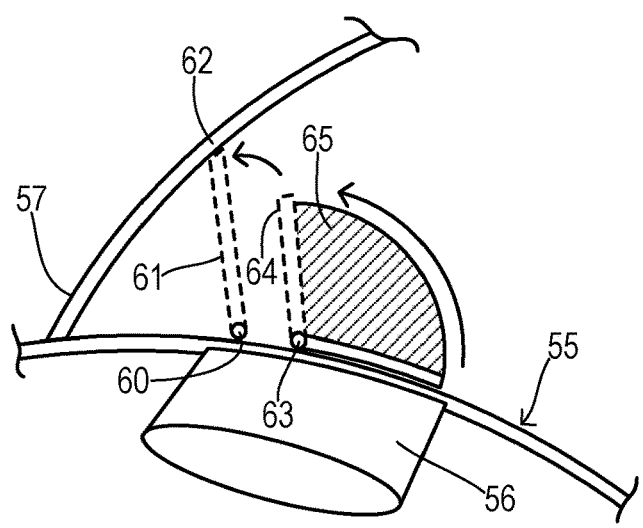
FIG. 8 is a diagrammatic view comparing a door sweep zone of an unshifted hinge location and a shifted hinge location.
Figure 9:
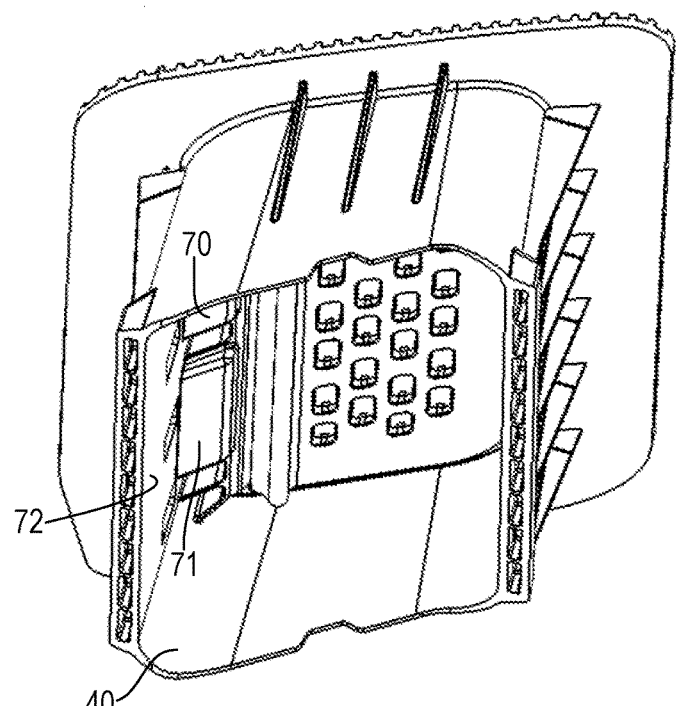
FIG. 9 is a bottom perspective view of the chute assembly of FIG. 4 showing an apron pocket extending from the chute outer wall to join the hinge.
Figure 11:
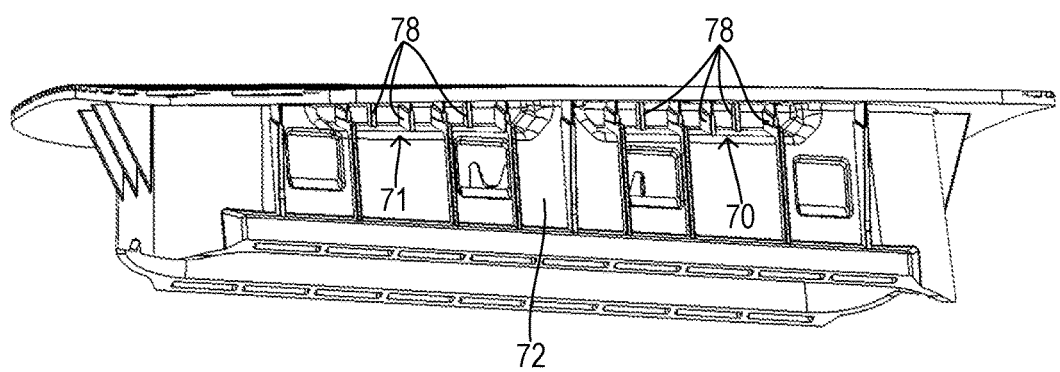
FIG. 11 is a side view of the chute assembly, looking into the apron pockets.

FIG. 8 compares the invention with a conventional configuration. An instrument panel 55 supports a chute assembly 56 behind a windshield 57. A conventional hinge location 60 results in a door flap 61 having a sweep zone with an impact point 62 against windshield 57. In contrast, the use of an apron extension to provide a hinge location 63 results in a door flap 64 having a sweep zone 65 which is shifted and shortened away from windshield 57 so that no impact can occur.

In order to provide sufficient hinge support and to facilitate advancement of the air bag through the narrowed door opening, apron 50 preferably comprises a combination of pockets and gussets as best shown in FIGS. 9-13, wherein the pocket(s) has an inner end receiving an edge of the hinge so that the sweep zone of the door flap is shifted in the predetermined direction by a distance corresponding to a depth of the pocket(s). The pocket structure is adapted to injection molding of the chute assembly as a single integrated component so that the invention can be practiced without incurring any additional cost or parts count.

Figure 10:
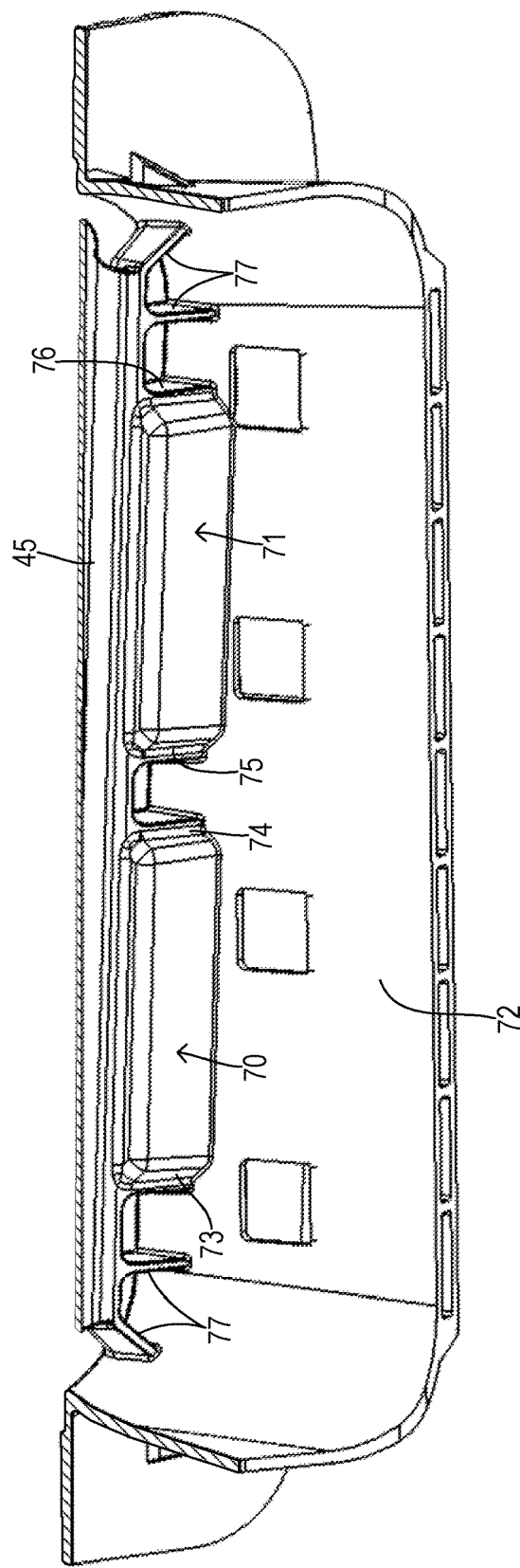
FIG. 10 is a cross-sectioned, bottom perspective view showing apron pockets and gussets for supporting an S-hinge.

In the illustrated embodiment, two separate pockets 70 and 71 are formed as indentations from a side wall 72 of chute 40. As best shown in FIG. 10, pocket 70 has side walls 73 and 74 and pocket 71 has side walls 75 and 76 that join together wall 72, apron 50, and hinge 45. In areas adjacent to pockets 70 and 71, a plurality of gussets 77 are provided that also join together wall 72, apron 50, and hinge 45 to increase the structural strength. Referring to the side view of FIG. 11, the interiors of pockets 70 and 71 are shown to include interior crossing ribs 78 to further stabilize apron 50. Ribs 78 are generally perpendicular to side wall 72 for ease of injection molding (e.g., appropriate tooling slides in a molding die can be used to create the interior spaces in the pockets between the ribs).

Figure 12:
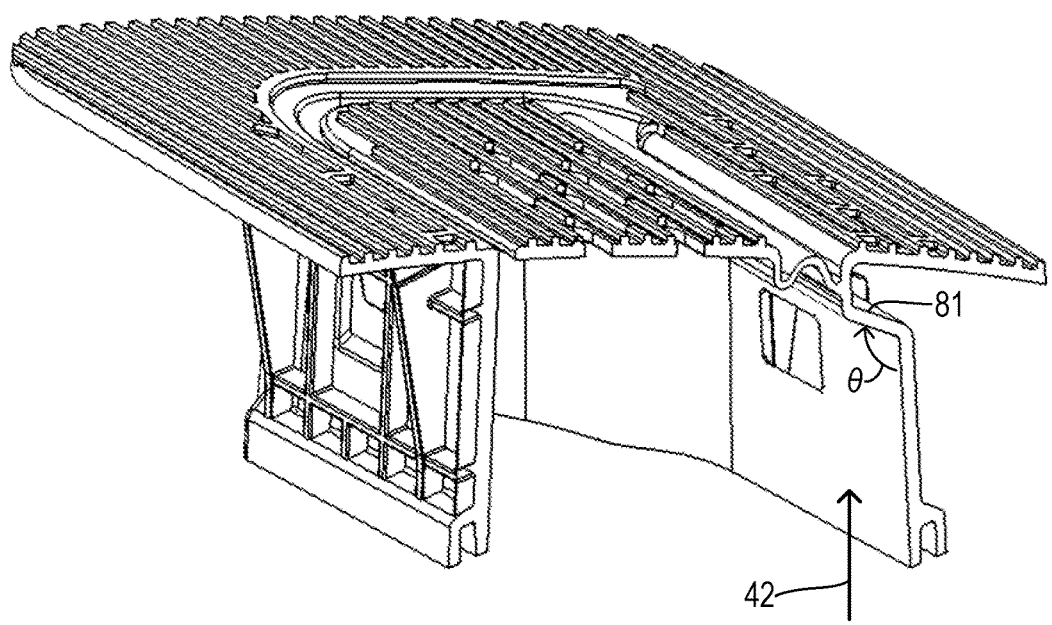
FIG. 12 is a cross-sectional perspective view of the chute assembly of FIG. 4.

To help direct an expanding air bag into the narrowed door profile, pockets 70 and 71 have bottom walls 80 and 81, respectively, that are sloped in the direction of air bag travel up the chute. FIG. 12 shows sloped bottom wall 81 of pocket 71 inclined toward the direction of deployment path 42 (i.e., an angle θ is greater than) 90°.

Figure 13:
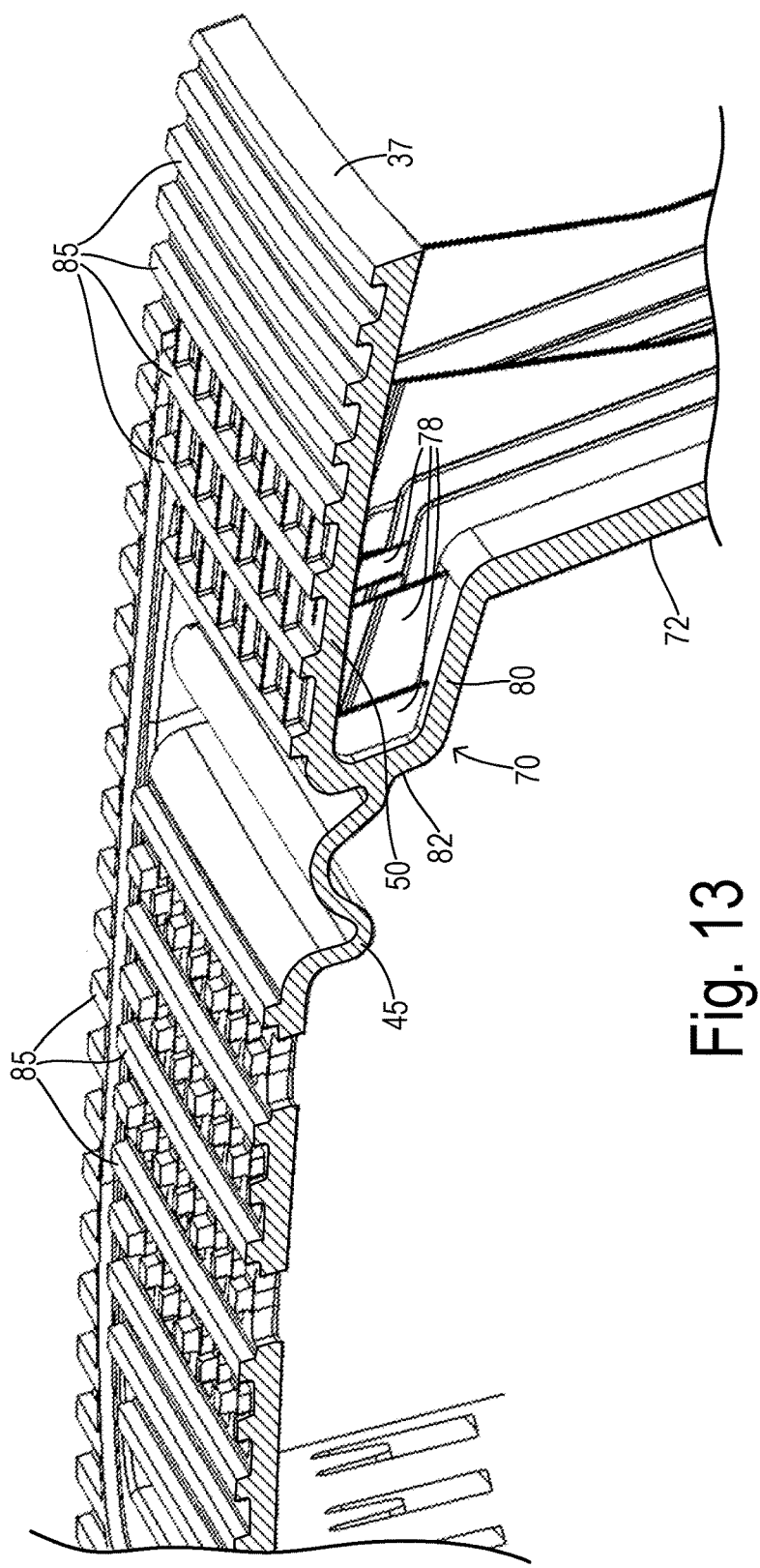
FIG. 13 is cross-sectional view showing the apron, pocket, and S-hinge in greater detail.

FIG. 13 shows pocket 70 in greater detail. Pocket 70 has an end wall 82 forming its inner end between bottom wall 80 and apron 50. Hinge 45 extends from end wall 82, resulting in a hinge pivot axis which is spaced away from the window-facing side of the chute. Hinge 45 and end wall 82 are shown as part of a unitary injection molded component, although other embodiments could include separate components such as a stamped sheet metal hinge and door flap which are insert molded into a plastic main chute body.

FIG. 13 further shows that upper surfaces of collar 36, door flap 43, and apron 50 all preferably include welding ribs 85 for attaching chute assembly 35 to an instrument panel substrate in a conventional manner.

What is claimed is:

1. An air bag chute assembly for an automotive instrument panel, comprising:
   an outer flange collar configured to attach to the instrument panel and defining a window-facing side;
   a tubular chute extending interiorly from the collar to a lower end defining a deployment path configured to receive an inflating air bag from an air bag module;
   a door flap disposed in an upper end of the chute and spaced from the collar;
   an S-shaped hinge with a first edge arranged along a side of the door flap; and
   an apron extending in a predetermined direction laterally into the deployment path from the window-facing side of the collar, the apron comprising a plurality of pockets spaced along the window-facing side of the collar, each pocket having an inner end receiving a second edge of the hinge so that a sweep zone of the door flap is shifted in the predetermined direction by a distance corresponding to a reduction in a width of the deployment path at the upper end caused by the apron.

2. The chute assembly of claim 1 wherein a reduction of the width of the deployment path is greater than 5%.

3. The chute assembly of claim 1 wherein a reduction of the width of the deployment path is in a range of 5% to 40%.

4. The chute assembly of claim 1 wherein a reduction of the width of the deployment path is in a range of 15% to 35%.

5. The chute assembly of claim 1 wherein each pocket comprises a sloped lower surface which is inclined toward a deployment direction of the deployment path.

6. The chute assembly of claim 1 wherein the pockets include a plurality of interior crossing ribs for stabilizing the apron.

7. The chute assembly of claim 1 further comprising a plurality of gussets adjacent the pockets and connecting the chute to the S-hinge.

8. The chute assembly of claim 1 wherein upper surfaces of the collar, door flap, and apron include welding ribs adapted for welding to a substrate of the instrument panel.

9. The chute assembly of claim 1 wherein the outer flange collar, tubular chute, and apron are comprised of an integral plastic molding.

10. A passenger air bag system, comprising:
    an instrument panel substrate defining an opening;
    a chute assembly having a door flap installed at the opening; and
    an air bag module mounted to the chute assembly and comprising an inflatable bag for deploying through the chute assembly to push open the door flap;
    wherein the chute assembly comprises:
      an outer flange collar configured to attach to the substrate and defining a window-facing side;
      a tubular chute extending interiorly from the collar to a lower end defining a deployment path configured to receive the inflatable bag;
      an S-shaped hinge with a first edge arranged along a side of the door flap; and
      an apron extending in a predetermined direction laterally into the deployment path from the window-facing side of the collar, the apron comprising a plurality of pockets spaced along the window-facing side of the collar, each pocket having an inner end receiving a second edge of the hinge so that a sweep zone of the door flap is shifted in the predetermined direction by a distance corresponding to a reduction in a width of the deployment path at the upper end caused by the apron.

11. The passenger air bag system of claim 10 wherein a reduction of the width of the deployment path is greater than 5%.

12. The passenger air bag system of claim 10 wherein a reduction of the width of the deployment path is in a range of 5% to 40%.

13. The passenger air bag system of claim 10 wherein a reduction of the width of the deployment path is in a range of 15% to 35%.

14. The passenger air bag system of claim 10 wherein each pocket comprises a sloped lower surface which is inclined toward a deployment direction of the deployment path.

15. The passenger air bag system of claim 10 wherein the pockets include a plurality of interior crossing ribs for stabilizing the apron, and wherein the system further comprises a plurality of gussets adjacent the pockets and connecting the chute to the S-hinge.

16. An airbag chute assembly, comprising:
    an elongated chute with an upper mounting flange;
    apron pockets extending from a window side of the flange into the chute for a pocket depth, reducing a width of an airbag deployment path at a chute upper end; and
    an S-hinge joining a door flap to inner ends of the pockets so that a sweep zone of the door flap is shifted by a distance corresponding to the pocket depth.

17. The assembly of claim 16 wherein the reduction of the width of the deployment path is greater than 5%.

18. The assembly of claim 16 wherein the reduction of the width of the deployment path is in a range of 15% to 35%.

* * * * *